(12) United States Patent
Iwata et al.

(10) Patent No.: US 8,265,827 B2
(45) Date of Patent: Sep. 11, 2012

(54) PARKING ASSIST APPARATUS

(75) Inventors: Yoichi Iwata, Nagoya (JP); Tetsunori Haraguchi, Shizuoka-ken (JP); Masahiko Yanagihara, Nisshin (JP); Kazuya Watanabe, Anjo (JP); Yu Tanaka, Aichi-ken (JP); Jun Kadowaki, Anjo (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 12/676,510

(22) PCT Filed: Sep. 4, 2008

(86) PCT No.: PCT/IB2008/002295
§ 371 (c)(1),
(2), (4) Date: Jun. 2, 2010

(87) PCT Pub. No.: WO2009/031013
PCT Pub. Date: Mar. 12, 2009

(65) Prior Publication Data
US 2010/0235050 A1    Sep. 16, 2010

(30) Foreign Application Priority Data

Sep. 5, 2007 (JP) .................................. 2007-230241

(51) Int. Cl.
*A01B 69/00* (2006.01)
(52) U.S. Cl. ........................................ 701/41; 340/932.2
(58) Field of Classification Search .................... 701/36, 701/41; 340/436, 932.2
See application file for complete search history.

(56) References Cited

U.S. PATENT DOCUMENTS

| | | | |
|---|---|---|---|
| 5,717,606 A * | 2/1998 | Hara et al. | 701/44 |
| 6,275,754 B1 * | 8/2001 | Shimizu et al. | 701/41 |
| 6,356,828 B1 * | 3/2002 | Shimizu et al. | 701/41 |
| 6,424,895 B1 * | 7/2002 | Shimizu et al. | 701/41 |
| 6,657,555 B2 * | 12/2003 | Shimizu et al. | 340/932.2 |

(Continued)

FOREIGN PATENT DOCUMENTS

DE    36 27 438 A1    2/1988

(Continued)

OTHER PUBLICATIONS

Written Opinion and International Search Report for PCT/IB2008/002295, mailed on Aug. 5, 2009, 17 pages.

(Continued)

Primary Examiner — Helal A Algahaim
(74) Attorney, Agent, or Firm — Sughrue Mion, PLLC

(57) ABSTRACT

A parking assist apparatus (1) has: an identifying portion (2a) that identifies a target parking position when the vehicle is at a temporary stop position having a predetermined positional relation with the target parking position; a parking-assisting portion (2b) that assists steering operation of a driver of the vehicle based on the target parking position when parking the vehicle. For facilitating the driver to visually confirm a positional relation between a specific portion of the target parking position and the vehicle, the parking assist apparatus includes at least one of a polarizing film (8), auxiliary mirror (12), member (22,32) provided on a vehicle mirror and extending in the vehicle lateral direction, transparent portion (42) provided in a passenger-side door, adjusting device (53) that adjusts the direction of the lower edge of the vehicle mirror, irradiating device (74) that radiates a laser, optical-axis adjusting portion (83) that adjusts an optical axis of a headlight of the vehicle.

6 Claims, 19 Drawing Sheets

U.S. PATENT DOCUMENTS

| | | | |
|---|---|---|---|
| 7,009,551 B1 * | 3/2006 | Sapletal et al. | 342/70 |
| 7,099,758 B2 * | 8/2006 | Tanaka et al. | 701/36 |
| 7,431,117 B2 * | 10/2008 | Ito | 180/204 |
| 7,561,180 B2 * | 7/2009 | Koike | 348/148 |
| 7,755,508 B2 * | 7/2010 | Watanabe et al. | 340/903 |
| 2002/0041239 A1 * | 4/2002 | Shimizu et al. | 340/932.2 |
| 2002/0084916 A1 * | 7/2002 | Shimizu et al. | 340/932.2 |
| 2002/0186480 A1 * | 12/2002 | Jacobs | 359/843 |
| 2003/0146827 A1 * | 8/2003 | Koike | 340/435 |
| 2003/0147247 A1 * | 8/2003 | Koike | 362/464 |
| 2006/0069478 A1 * | 3/2006 | Iwama | 701/36 |
| 2006/0220910 A1 * | 10/2006 | Becker et al. | 340/932.2 |
| 2007/0177011 A1 * | 8/2007 | Lewin et al. | 348/118 |
| 2008/0140286 A1 * | 6/2008 | Jung | 701/41 |

FOREIGN PATENT DOCUMENTS

| | | |
|---|---|---|
| DE | 100 41 381 A1 | 4/2001 |
| DE | 10 2005 058 499 A1 | 6/2007 |
| JP | 1-179044 U | 12/1989 |
| JP | 5-46515 U | 6/1993 |
| JP | 5-54023 U | 7/1993 |
| JP | 6-270741 A | 9/1994 |
| JP | 2002-193027 A | 7/2002 |
| JP | 2002-240662 A | 8/2002 |
| JP | 2002-321568 A | 11/2002 |
| JP | 2003-40060 A | 2/2003 |
| JP | 2003-285685 A | 10/2003 |
| JP | 2004-352001 A | 12/2004 |
| JP | 2005-14720 A | 1/2005 |
| JP | 2005-59822 A | 3/2005 |
| JP | 2006-44517 A | 2/2006 |
| JP | 2006-290081 A | 10/2006 |

OTHER PUBLICATIONS

Japanese Office Action for counterpart JPA 2007-230241, drafting date Jul. 22, 2009, 5 pages.

Japanese Office Action issued in Japanese Application No. 2009-223405 dated Jun. 21, 2011.

* cited by examiner

PARKING ASSIST APPARATUS

BACKGROUND OF THE INVENTION

1. Field of the Invention

The invention relates to a parking assist apparatus applicable to various vehicles including passenger cars, trucks, and buses.

2. Description of the Related Art

In general, parking a vehicle requires much driving skill of the driver. If the driving skill is not enough, the driver often fails to smoothly park his or her vehicle and thus the operation load on the driver is large. In view of this, for example, Japanese Patent Application Publication No. 2003-40060 (JP-A-2003-40060) describes the following parking assist apparatus. According to this apparatus, when parking the vehicle, the driver temporarily stops the vehicle beside the target parking position. At this time, the parking assist apparatus identifies the target parking position, and then the vehicle is automatically driven obliquely forward from the temporary stop position and then backward, thus assisting the driver's parking operation.

According to this parking assist apparatus, when the driver stops the vehicle beside the target parking position temporarily, the driver stops the vehicle such that a mark provided on the inner side of the passenger-side door and the white line of the frame of the target parking position are alighted with each other as viewed from the driver. In this manner, however, because the mark is planar (two-dimensional) and the eye level of the driver varies depending upon various differences and variations among individual drivers including the size of the body of the driver, the position of the driver's seat, and so on. Therefore, the driver often fails to stop the vehicle beside the target parking position properly, and therefore the accuracy of the parking assist operation by the parking assist apparatus is not high, that is, the parking assist apparatus may fail to assist the driver's parking operation properly.

SUMMARY OF THE INVENTION

The invention provides a parking assist apparatus that more properly assists the steering operation of a driver.

First aspect of the invention relates to a parking assist apparatus for a vehicle, having: an identifying portion that identifies a target parking position when the vehicle is at a temporary stop position having a predetermined positional relation with the target parking position; a parking-assisting portion that assists steering operation of a driver of the vehicle based on the target parking position when parking the vehicle; and a polarizing film, provided on a side window glass of the vehicle and having a polarization direction coinciding with the lateral direction of the vehicle, for facilitating the driver to visually confirm a positional relation between a specific portion of the target parking position and the vehicle.

According to the parking assist apparatus described above, when stopping the vehicle at the temporary stop position, the driver first moves his or her head toward the polarizing film, that is, inward in the lateral direction of the vehicle, and then visually confirms a specific portion of the target parking position, such as a white line at the target parking position. As such, the direction of the driver's eyes toward the polarizing film is made uniform. In this manner, when stopping the vehicle beside the target parking position, the driver can properly stop the vehicle at the temporary stop position. According to the parking assist apparatus described above, thus, the accuracy of the parking assist operation is high, and therefore the parking operation of the driver can be more properly assisted.

Second aspect of the invention relates to a parking assist apparatus for a vehicle, having: an identifying portion that identifies a target parking position when the vehicle is at a temporary stop position having a predetermined positional relation with the target parking position; a parking-assisting portion that assists steering operation of a driver of the vehicle based on the target parking position when parking the vehicle; and an auxiliary mirror enabling the driver to observe the target parking position and a front or rear wheel of the vehicle, for facilitating the driver to visually confirm a positional relation between a specific portion of the target parking position and the vehicle. For example, the auxiliary mirror may be a convex mirror enabling the driver to visually confirm or observe the target parking position and the front or rear wheels of the vehicle at one time.

According to the parking assist apparatus described above, when stopping the vehicle at the temporary stop position, the driver visually confirms the positional relation between a specific portion of the target parking position, such as a white line at the target parking position, and the front or rear wheel of the vehicle. In this manner, when stopping the vehicle beside the target parking position, the driver can properly stop the vehicle at the temporary stop position. According to the parking assist apparatus described above, thus, the accuracy of the parking assist operation is high, and therefore the parking operation of the driver can be more properly assisted.

Third aspect of the present invention relates to a parking assist apparatus for a vehicle, having: an identifying portion that identifies a target parking position when the vehicle is at a temporary stop position having a predetermined positional relation with the target parking position; a parking-assisting portion that assists steering operation of a driver of the vehicle based on the target parking position when parking the vehicle; and a member provided on a vehicle mirror of the vehicle and extending in the lateral direction of the vehicle, for facilitating the driver to visually confirm a positional relation between a specific portion of the target parking position and the vehicle. The member may be a projecting portion provided adjacent to the vehicle mirror of the vehicle and projecting toward the outside in the lateral direction of the vehicle. For example, the vehicle mirror may be a door mirror of the vehicle.

According to the parking assist apparatus described above, when stopping the vehicle at the temporary stop position, the driver visually confirms the positional relation between a specific portion of the target parking position, such as a white line at the target parking position, and the projecting portion and then stops the vehicle at the temporary stop position. In this manner, when stopping the vehicle beside the target parking position, the driver can properly stop the vehicle at the temporary stop position. According to the parking assist apparatus described above, thus, the accuracy of the parking assist operation is high, and therefore the parking operation of the driver can be more properly assisted.

Further, the member may be an exterior part provided at a lower edge of a vehicle mirror of the vehicle and extending in the lateral direction of the vehicle.

According to the parking assist apparatus described above, when stopping the vehicle at the temporary stop position, the driver visually confirms the positional relation between a specific portion of the target parking position, such as a white line at the target parking position, and the exterior part and then stops the vehicle at the temporary stop position. In this manner, when stopping the vehicle beside the target parking position, the driver can properly stop the vehicle at the temporary stop position. According to the parking assist apparatus described above, thus, the accuracy of the parking assist operation is high, and therefore the parking operation of the driver can be more properly assisted.

Fourth aspect of the present invention relates to a parking assist apparatus for a vehicle, having: an identifying portion that identifies a target parking position when the vehicle is at a temporary stop position having a predetermined positional relation with the target parking position; a parking-assisting portion that assists steering operation of a driver of the vehicle based on the target parking position when parking the vehicle; and a transparent portion, provided at a passenger-side door of the vehicle, that enables the driver to observe the target parking position therethrough, for facilitating the driver to visually confirm a positional relation between a specific portion of the target parking position and the vehicle.

According to the parking assist apparatus described above, when stopping the vehicle at the temporary stop position, the driver visually confirms the positional relation between a specific portion of the target parking position, such as a white line at the target parking position, and the transparent portion and then stops the vehicle at the temporary stop position. In this manner, when stopping the vehicle beside the target parking position, the driver can properly stop the vehicle at the temporary stop position. According to the parking assist apparatus described above, thus, the accuracy of the parking assist operation is high, and therefore the parking operation of the driver can be more properly assisted.

Fifth aspect of the present invention relates to a parking assist apparatus for a vehicle, having: an identifying portion that identifies a target parking position when the vehicle is at a temporary stop position having a predetermined positional relation with the target parking position; a parking-assisting portion that assists steering operation of a driver of the vehicle based on the target parking position when parking the vehicle; and a vehicle mirror of the vehicle and an adjusting portion that adjusts the direction of a lower edge of the vehicle mirror to the lateral direction of the vehicle, for facilitating the driver to visually confirm a positional relation between a specific portion of the target parking position and the vehicle.

In this case, the parking assist apparatus may further have an on-off portion that turns the parking assist apparatus on and off, and the adjusting portion may be adapted to adjust the direction of the lower edge of the vehicle mirror to the lateral direction of the vehicle when the on-off portion is on.

According to the parking assist apparatus described above, when stopping the vehicle at the temporary stop position, the driver visually confirms the positional relation between a specific portion of the target parking position, such as a white line at the target parking position, and the lower edge of the vehicle mirror and then stops the vehicle at the temporary stop position. In this manner, when stopping the vehicle beside the target parking position, the driver can properly stop the vehicle at the temporary stop position. According to the parking assist apparatus described above, thus, the accuracy of the parking assist operation is high, and therefore the parking operation of the driver can be more properly assisted.

According to the parking assist apparatus described above, further, because the direction of the lower edge of the vehicle mirror of the vehicle is adjusted to the lateral direction of the vehicle only when the on-off switch of the parking assist apparatus is on, the vehicle mirror can be used as usual when the parking assist apparatus is not used.

Sixth aspect of the present invention relates to a parking assist apparatus for a vehicle, having: an identifying portion that identifies a target parking position when the vehicle is at a temporary stop position having a predetermined positional relation with the target parking position; a parking-assisting portion that assists steering operation of a driver of the vehicle based on the target parking position when parking the vehicle; and an irradiating device that radiates a laser obliquely downward to a road surface on the outer side of the vehicle in the lateral direction of the vehicle, for facilitating the driver to visually confirm a positional relation between a specific portion of the target parking position and the vehicle.

In this case, further, the parking assist apparatus may further have an on-off portion that turns the parking assist apparatus on and off, and the adjusting portion may be adapted to adjust the movable mirror portion of the vehicle mirror so as to enable the driver to visually confirm the target parking position when the on-off portion is on, and the irradiating device may be adapted to radiate the laser when the on-off portion is on.

According to the parking assist apparatus described above, when stopping the vehicle at the temporary stop position, the driver visually confirms the positional relation between a specific portion of the target parking position, such as a white line at the target parking position, and the laser radiated to the road surface and then stops the vehicle at the temporary stop position. In this manner, when stopping the vehicle beside the target parking position, the driver can properly stop the vehicle at the temporary stop position. According to the parking assist apparatus described above, thus, the accuracy of the parking assist operation is high, and therefore the parking operation of the driver can be more properly assisted.

According to the parking assist apparatus described above, further, because the movable mirror portion is adjusted to enable the driver to visually confirm the target parking position only when the on-off switch of the parking assist apparatus is on, the vehicle mirror can be used as usual when the parking assist apparatus is not used.

According to the parking assist apparatus described above, further, the laser irradiation is performed only when the on-off portion of the parking assist apparatus is on, that is, the laser irradiation is stopped when the parking assist apparatus is not used, which improves the safety for small pedestrians such as children.

Seventh aspect of the present invention relates to a parking assist apparatus for a vehicle, having: an identifying portion that identifies a target parking position when the vehicle is at a temporary stop position having a predetermined positional relation with the target parking position; a parking-assisting portion that assists steering operation of a driver of the vehicle based on the target parking position when parking the vehicle; an optical-axis adjusting portion that adjusts an optical axis of a headlight of the vehicle, for facilitating the driver to visually confirm a positional relation between a specific portion of the target parking position and the vehicle.

In this case, the parking assist apparatus may further have an on-off portion that turns the parking assist apparatus on and off, and the optical-axis adjusting portion may be adapted to adjust the optical axis of the headlight of the vehicle when the on-off portion is on. For example, the optical-axis adjusting portion may be an actuator having a drive portion that drives the headlight to pivot about an axis extending in the lateral direction of the vehicle.

According to the parking assist apparatus described above, when stopping the vehicle at the temporary stop position, the driver visually c>>nfirras the positional relation between a specific portion of the target parking position, such as a white line at the target parking position, and an edge of the area to which light is radiated from the headlight and then stops the vehicle at the temporary stop position. In this manner, when stopping the vehicle beside the target parking position, the driver can properly stop the vehicle at the temporary stop position. According to the parking assist apparatus described above, thus, the accuracy of the parking assist operation is high, and therefore the parking operation of the driver can be more properly assisted.

According to the parking assist apparatus described above, further, because the optical axis of the headlight is adjusted only when the on-off switch of the parking assist apparatus is on, the headlight can be used as usual when the parking assist apparatus is not used.

As described above, because the mark is shown stereoscopically in the lateral direction of a vehicle (i.e., is given a dimension in the lateral direction of a vehicle), or the parking position is directly irradiated, the vehicle operator can visually confirm the positional relationship between a target parking position and the position of the vehicle more accurately.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
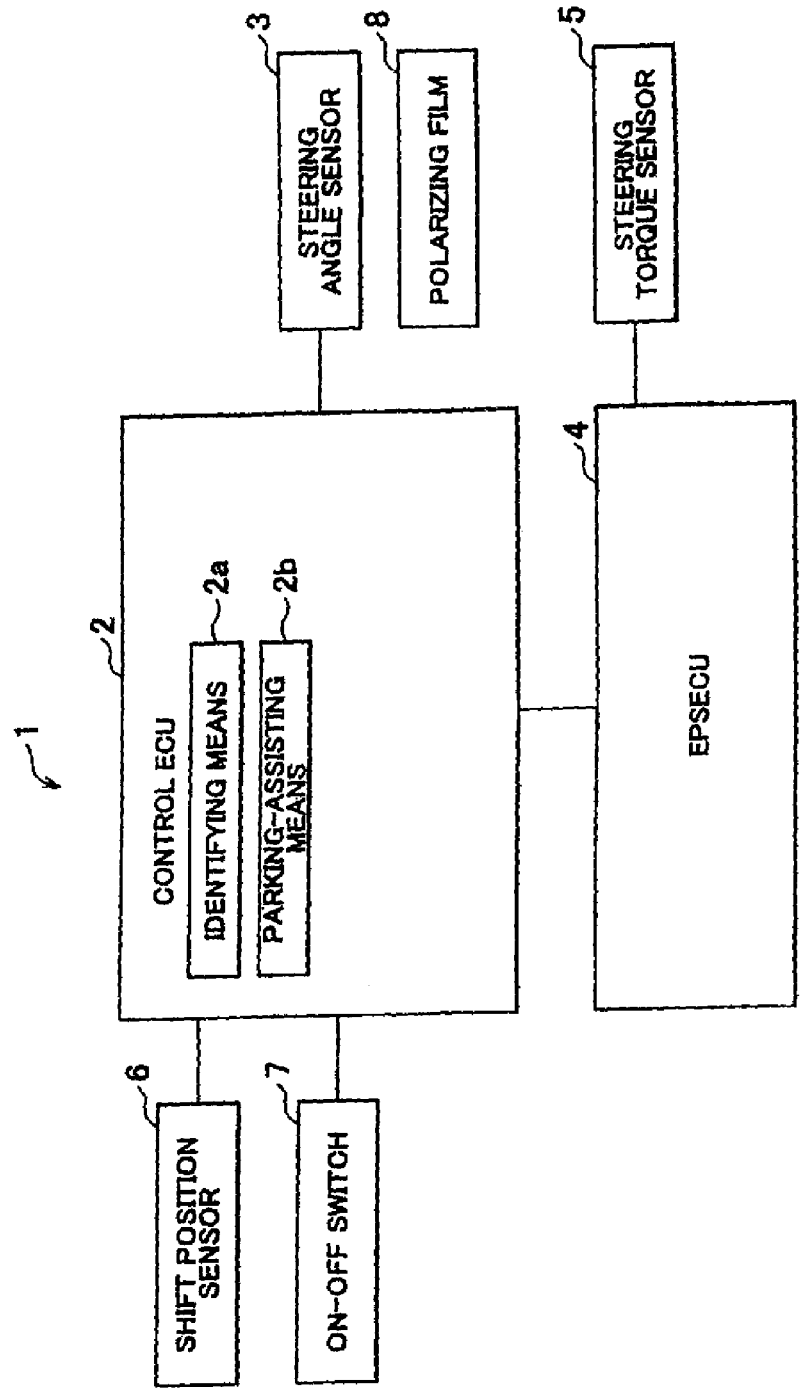
FIG. 1 is a block diagram illustrating the configuration of a parking assist apparatus according to the first example embodiment of the invention.
Figure 2:
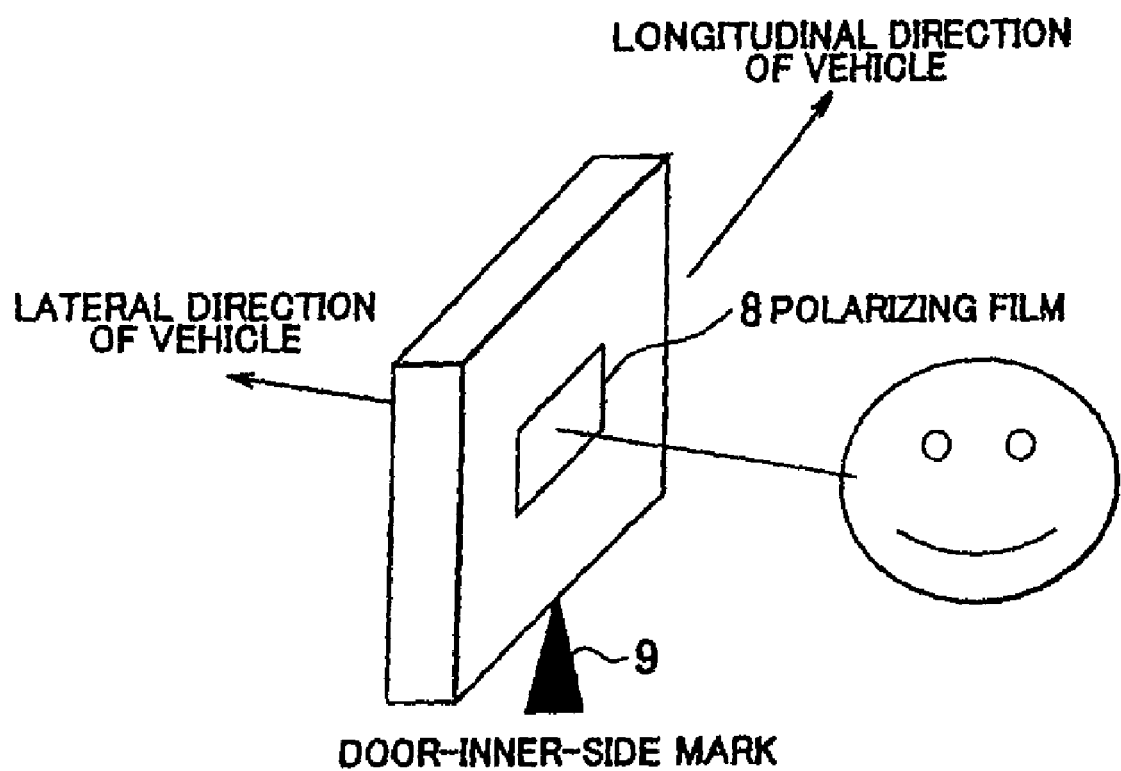
FIG. 2 is a view schematically showing a portion of the parking assist apparatus of the first example embodiment of the invention.
Figure 3:
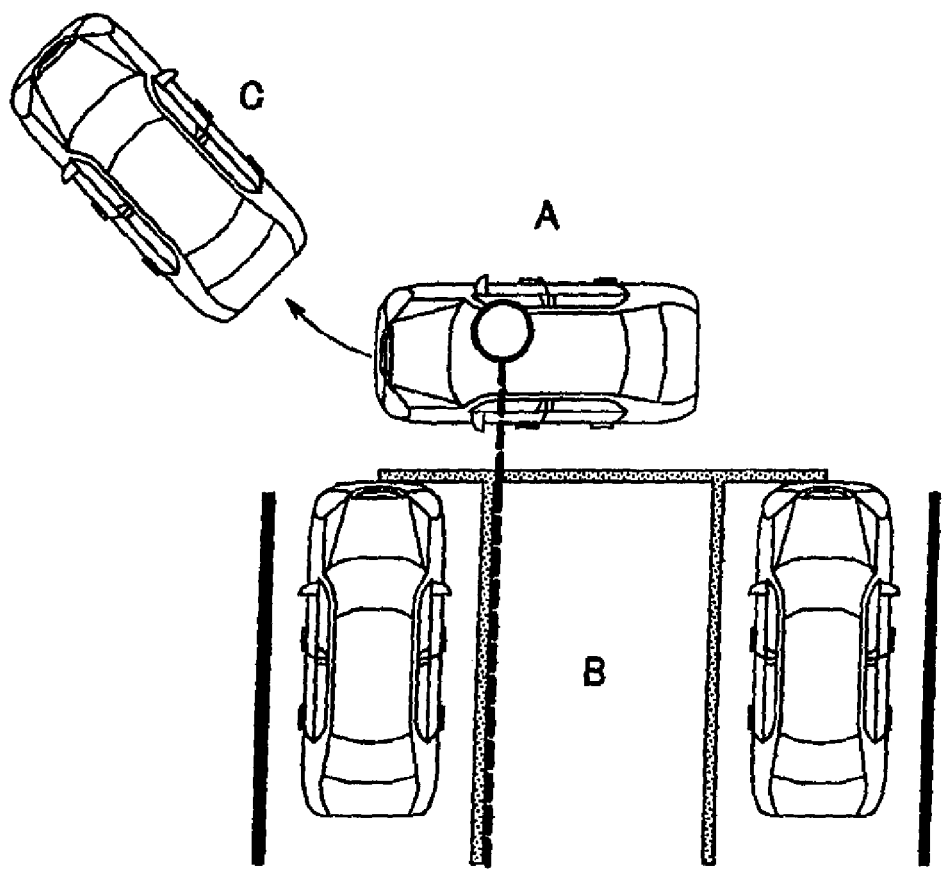
FIG. 3 is a view schematically illustrating the moving paths of a vehicle incorporating the parking assist apparatus of the first example embodiment of the invention.

FIG. 1 is a block diagram showing the configuration of a parking assist apparatus 1 according to the first example embodiment of the invention. FIG. 2 is a view schematically showing a portion of the parking assist apparatus 1. FIG. 3 is a view schematically showing the moving path of a vehicle incorporating the parking assist apparatus 1 when the vehicle is parked.

Referring to FIG. 1 and FIG. 2, the parking assist apparatus 1 has a control ECU (Electronic Control Unit) 2, a steering angle sensor 3, an EPS-ECU (Electronic Power Steering Electronic Control Unit) 4, a steering torque sensor 5, a shift position sensor 6, an on-off switch 7, a polarizing film 8, and a door-inner-side mark 9.

The control ECU 2 is constituted of, for example, a CPU (Central Processing Unit), a ROM (Read Only Memory), a RAM (Random Access Memory), etc., which are connected to each other via data buses. The CPU performs various controls, including those described later, on programs stored in the ROM. The control ECU 2 has an identifying means 2a and a parking-assisting means 2b. The control ECU 2 is connected to the EPS-ECU 4 via a communication network of a given communication standard, such as CAN (Controller Area Network).

The EPS-ECU 4 is constituted of, for example, a CPU, a ROM, a RAM, etc., which are connected to each other via data buses, and the CPU controls the steering angle by controlling, on given programs stored in the ROM, an electric motor of an assist-force generation portion of an electric power steering apparatus, not shown in the drawings.

The electronic power steering apparatus is, for example, of a rack-and-pinion type. The electronic power steering apparatus has a steering torque sensor 5 that is provided at a steering shaft linked to a steering wheel, not shown in the drawings, to detect the steering operation force of the driver and determine whether the driver is operating the steering wheel, an assist-force generation portion that generates assist force by driving the electric motor according to the steering operation force detected by the steering torque sensor 5 or in response to commands from the control ECU 2, and a steering angle sensor 3 that detects the steering angle from the rotational angle of the rotor of the electric motor of the assist-force generation portion.

As well as the above components, the electronic power-steering apparatus has a pinion shaft linked to the steering shaft, not shown in the drawings, and a rack shaft extending in the lateral direction of the vehicle. The pinion shaft and the rack shaft are in mesh with each other, transferring parking-assist force from the pinion shaft to the rack shaft Thus, the parking-assist force generation portion generates parking-assist force based on the steering-operation force of the driver, moving the rack shaft in the lateral direction of the vehicle. Tie rods are linked to the both ends of the rack shaft, and the front wheels, not shown in the drawings, that are connected to the tie rods are steered as the rack shaft moves in the lateral direction of the vehicle.

The shift position sensor 6 is disposed at a shift lever, not shown in the drawings. When the shift lever is at the drive position, the parking-assisting means 2b determines based on the result of detection by the shift position sensor 6 that the vehicle is presently in the forward drive mode. On the other hand, when the shift lever is at the reverse position, the parking-assisting means 2b determines based on the result of detection by the shift position sensor 6 that the vehicle is presently in the reverse drive mode.

The on-off switch 7 serves as an on-off means for selecting whether to turn the parking assist apparatus 1 on or off. That is, it allows the driver of the vehicle to select whether to use the parking assist apparatus 1 for parking assist.

The polarizing film 8 is affixed on the inner side of the side window at the passenger side of the vehicle, and its polarization direction coincides with the lateral direction of the vehicle. Thus, only lights traveling in the lateral direction of the vehicle can pass through the polarizing film 8. The polarizing film 8 serves as a parking-facilitating means for, when the driver is attempting to stop the vehicle at the temporary stop position A shown in FIG. 3, facilitating the driver to stop the vehicle at the temporary stop position A properly without being affected by the differences and variations among individual drivers.

The door-inner-side mark 9 is attached on the passenger-side door at a position lower than the polarizing film 8 and is used as follows. When stopping the vehicle at the temporary stop position A, the driver moves the vehicle so as to align the door-inner-side mark 9 with the white line at a target parking position B shown in FIG. 3.

When the driver has turned the on-off switch 7 on at the temporary stop position A, the identifying means 2a identifies the target parking position. B having a predetermined positional relation with the temporary stop position A.

The parking-assisting means 2b assists the driver's steering operation based on the target parking position B by controlling the EPS-ECU 4 based on the information regarding the distances and the steering angles for attaining the forward drive path from the temporary stop position A to a stop-and-reverse position C shown in FIG. 3 and the information regarding the distances and the steering angles for attaining the reverse drive path from the stop-and-reverse position C to the target parking position B.

At this time, if it is detected by the steering torque sensor 5 that the driver is now operating the steering wheel, the parking-assisting means 2b stops the parking assist operation under given conditions, such as the vehicle speed being higher than a predetermined speed.

According to the parking assist apparatus described above, when stopping the vehicle at the temporary stop position A, the driver first moves his or her head toward the polarizing film 8, that is, inward in the lateral direction of the vehicle, and then visually confirms a specific portion of the target parking position B, such as the white line at the left side of the target parking position B, and then stops the vehicle such that the door-inner-side mark 9 is aligned with the white line. As such, the direction of the driver's eyes toward the polarizing film 8 is made uniform. In this manner, when stopping the vehicle beside the target parking position B, the driver can properly stop the vehicle at the temporary stop position A. According to the parking assist apparatus 1 described above, thus, the accuracy of the parking assist operation is high, and therefore the parking operation of the driver can be more properly assisted.

While the polarizing film 8 is used for facilitating the driver visually confirm a positional relation between the target parking position and the vehicle in the first example embodiment of the invention, an auxiliary mirror may alternatively be used as in the parking assist apparatus of the second example embodiment of the invention described below.

Figure 4:
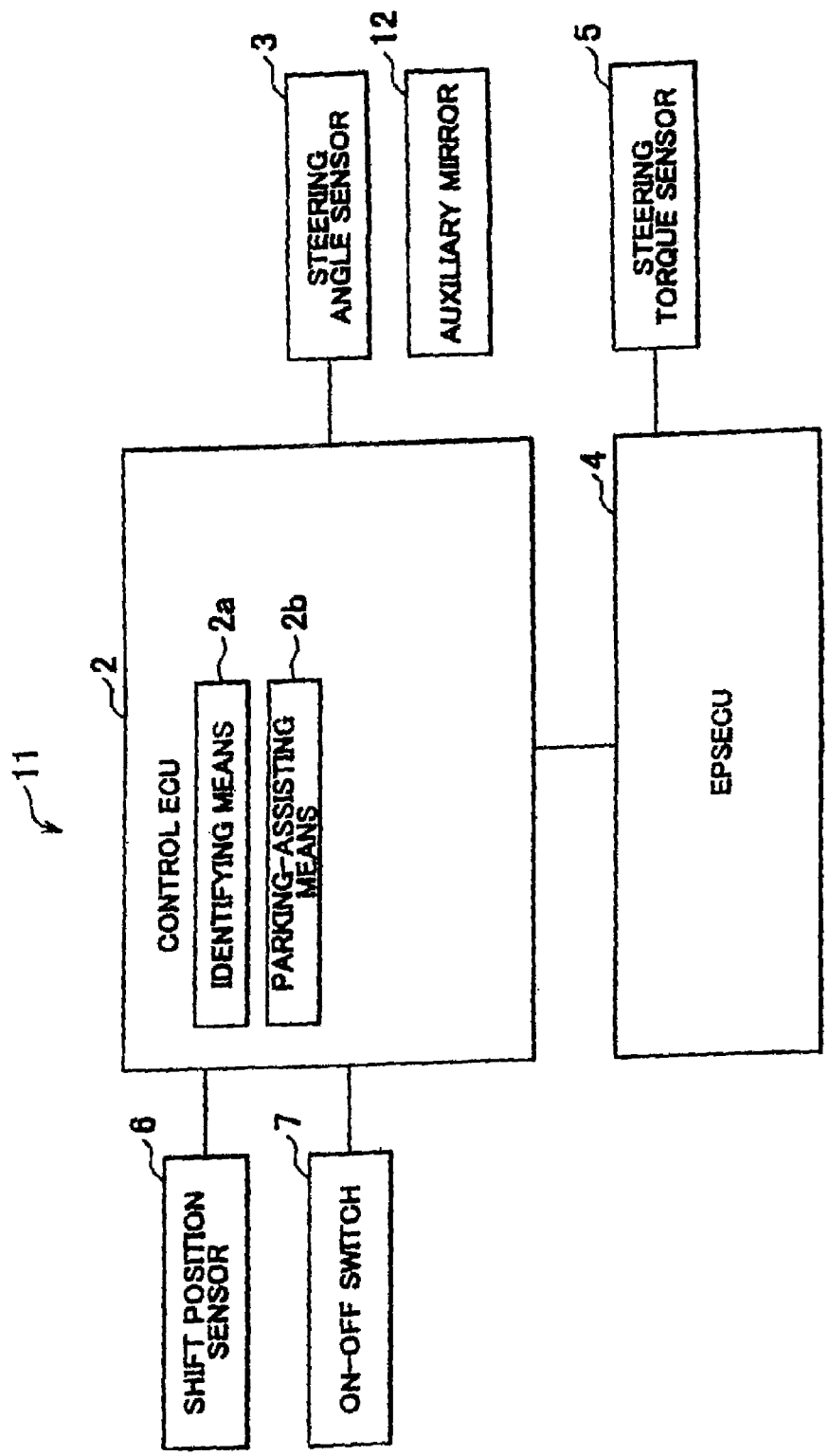
FIG. 4 is a block diagram illustrating the configuration of a parking assist apparatus according to the second example embodiment of the invention.
Figure 5:
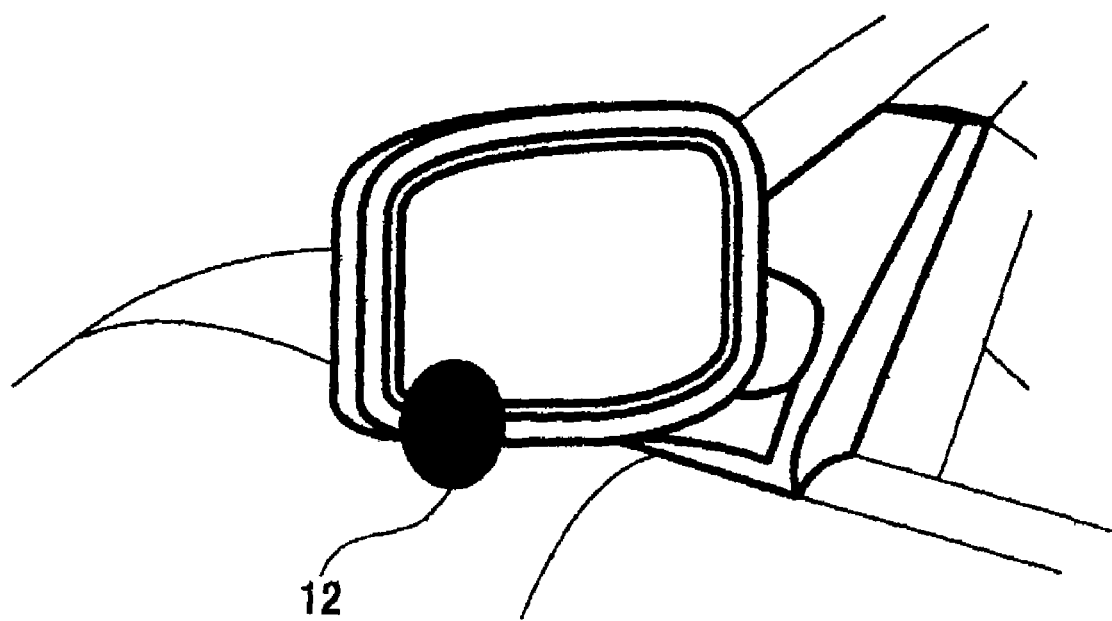
FIG. 5 is a view schematically showing a portion of the parking assist apparatus of the second example embodiment of the invention.

FIG. 4 is a block diagram showing the configuration of a parking assist apparatus 1 according to the second example embodiment of the invention. FIG. 5 is a view schematically showing a portion of the parking assist apparatus 11.

Referring to FIG. 4 and FIG. 5, the parking assist apparatus 11 has the control ECU 2, the steering angle sensor 3, the EPS-ECU 4, the steering torque sensor 5, the shift position sensor 6, the on-off switch 7, and an auxiliary mirror 12. Note that the structural elements identical to those of the parking assist apparatus of the first example embodiment are denoted by the same reference numerals and their descriptions are not repeated.

The auxiliary mirror 12 is disposed below the door mirror on the passenger side. The auxiliary mirror 12 is a convex mirror enabling the driver to visually confirm or observe the target parking position. B shown in FIG. 3 and the front or rear wheel of the vehicle. The auxiliary mirror 12 serves as a parking-facilitating means for, when the driver is attempting to stop the vehicle at the temporary stop position A shown in FIG. 3, facilitating the driver to stop the vehicle at the temporary stop position A properly without being affected by the differences and variations among individual drivers.

According to the parking assist apparatus described above, when stopping the vehicle at the temporary stop position A, the driver visually confirms the positional relation between a specific portion of the target parking position B, such as a white line at the target parking position B, and the front or rear wheel of the vehicle. In this manner, when stopping the vehicle beside the target parking position B, the driver can properly stop the vehicle at the temporary stop position A. According to the parking assist apparatus 11 described above, thus, the accuracy of the parking assist operation is high, and therefore the parking operation of the driver can be more properly assisted.

While the auxiliary mirror 12 is used for facilitating the driver visually confirm a positional relation between the target parking position and the vehicle in the second example embodiment of the invention, a projecting portion that projects outward in the lateral direction of the vehicle from a portion adjacent the door mirror of the vehicle may alternatively be used as in the parking assist apparatus of the third example embodiment of the invention described below.

Figure 6:
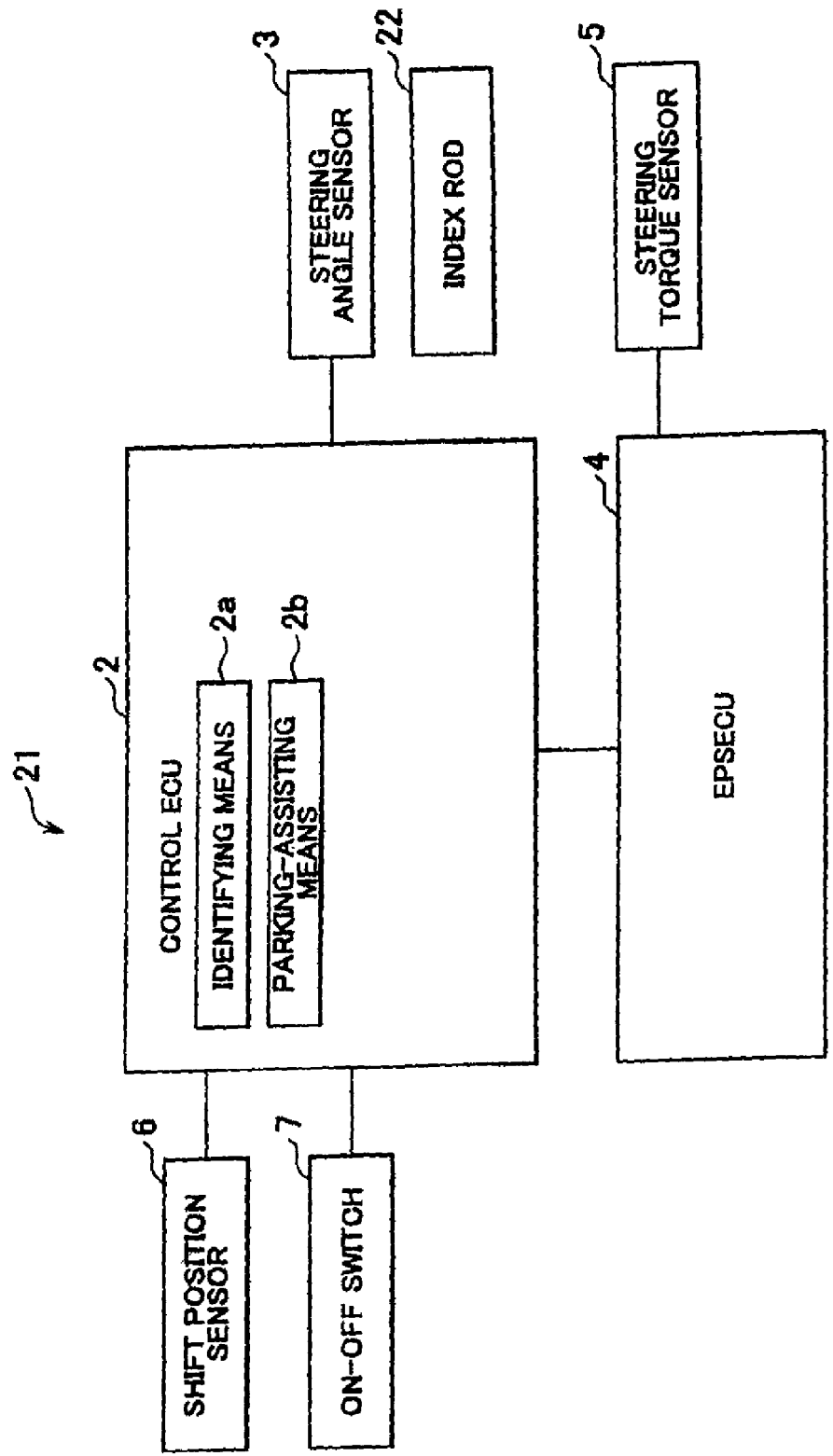
FIG. 6 is a block diagram illustrating the configuration of a parking assist apparatus according to the third example embodiment of the invention.
Figure 7:
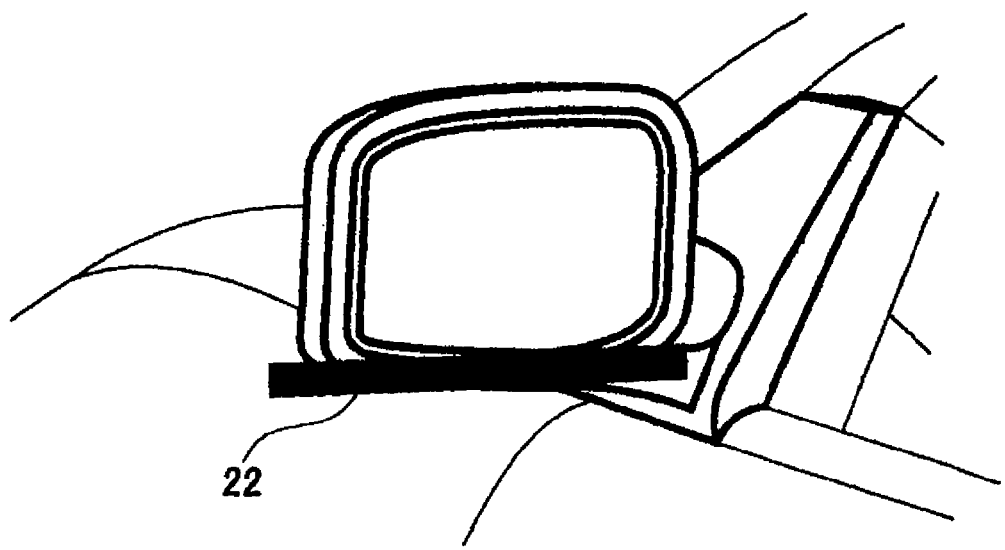
FIG. 7 is a view schematically showing a portion of the parking assist apparatus of the third example embodiment of the invention.

FIG. 6 is a block diagram showing the configuration of a parking assist apparatus 21 according to the third example embodiment of the invention. FIG. 7 is a view schematically showing a portion of the parking assist apparatus 21.

Referring to FIG. 6 and FIG. 7, the parking assist apparatus 21 has the control ECU 2, the steering angle sensor 3, the EPS-ECU 4, the steering torque sensor 5, the shift position sensor 6, the on-off switch 7, and an index rod 22. Note that the structural elements identical to those of the parking assist apparatus of the first example embodiment are denoted by the same reference numerals and their descriptions are not repeated.

The index rod 22 is a projecting portion disposed adjacent to the door mirror on the passenger side and projecting outward in the lateral direction of the vehicle. The index rod 22 serves as a parking-facilitating means for, when the driver is attempting to stop the vehicle at the temporary stop position A shown in FIG. 3, facilitating the driver to stop the vehicle at the temporary stop position A properly without being affected by the differences and variations among individual drivers.

According to the parking assist apparatus described above, when stopping the vehicle at the temporary stop position A, the driver visually confirms the positional relation between a specific portion of the target parking position B, such as the white line at the target parking position B, and the index rod 22 and then stops the vehicle at the temporary stop position A. In this manner, when stopping the vehicle beside the target parking position B, the driver can properly stop the vehicle at the temporary stop position A. According to the parking assist apparatus 31 described above, thus, the accuracy of the parking assist operation is high, and therefore the parking operation of the driver can be more properly assisted.

While the index rod 22 is used for facilitating the driver visually confirm a positional relation between the target parking position and the vehicle in the third example embodiment of the invention, an exterior part provided at the door mirror of the vehicle may alternatively be used as in the parking assist apparatus of the forth example embodiment of the invention described below.

Figure 8:
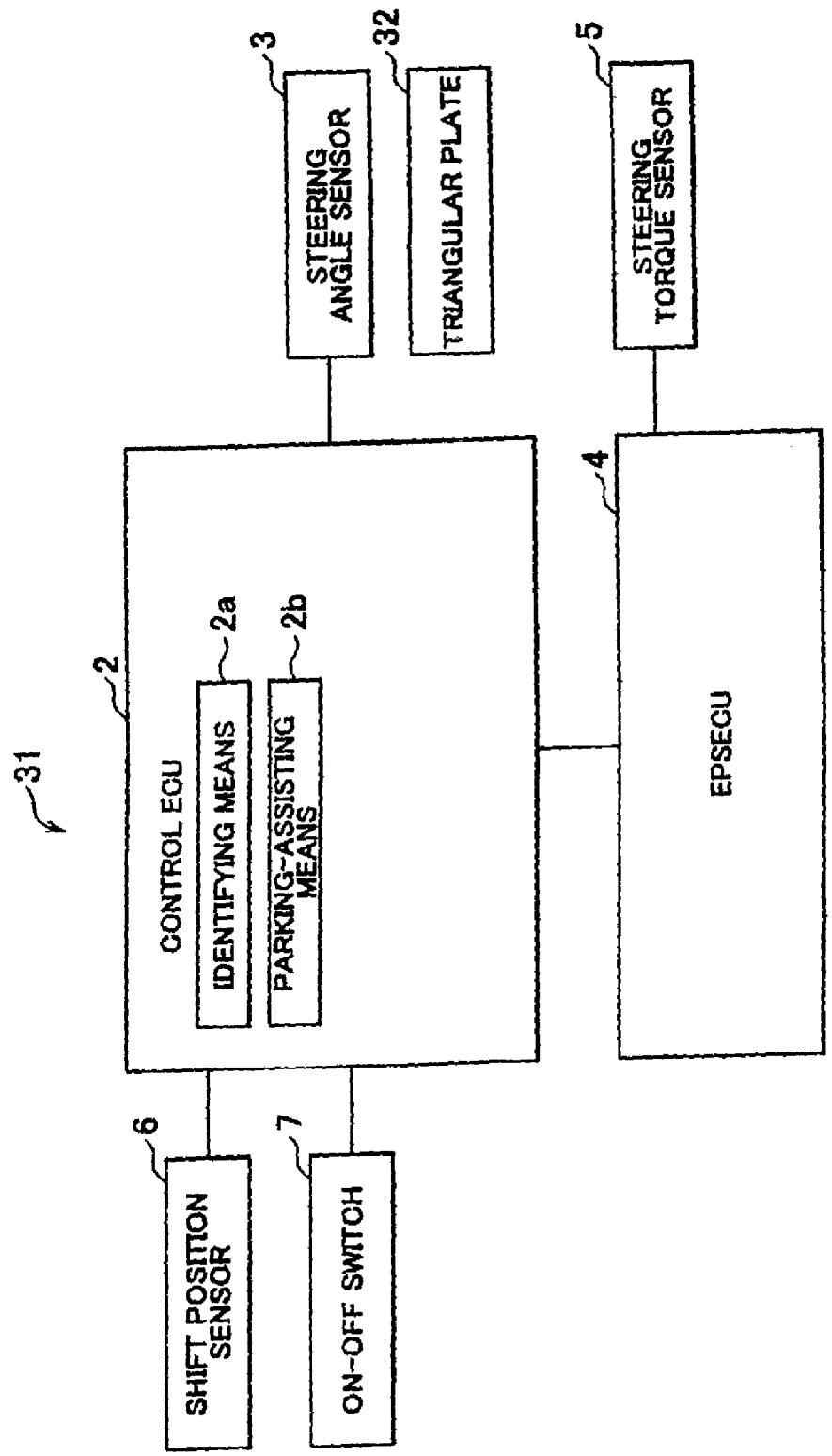
FIG. 8 is a block diagram illustrating the configuration of a parking assist apparatus according to the fourth example embodiment of the invention.
Figure 9:
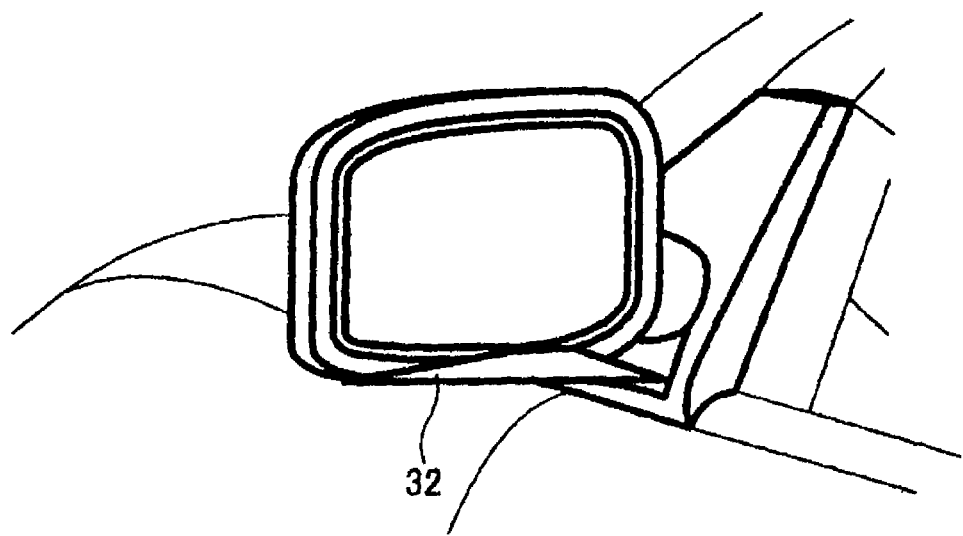
FIG. 9 is a view schematically showing a portion of the parking assist apparatus of the fourth example embodiment of the invention.

FIG. 8 is a block diagram showing the configuration of a parking assist apparatus 31 according to the fourth example embodiment of the invention. FIG. 9 is a view schematically showing a portion of the parking assist apparatus 31.

Referring to FIG. 8 and FIG. 9, the parking assist apparatus 31 has the control ECU 2, the steering angle sensor 3, the EPS-ECU 4, the steering torque sensor 5, the shift position sensor 6, the on-off switch 7, and a triangular plate 32. Note that the structural elements identical to those of the parking assist apparatus of the first example embodiment are denoted by the same reference numerals and their descriptions are not repeated.

The edge of the triangular plate 32 on the rear side of the vehicle is an exterior part provided at the lower edge of the door mirror of the vehicle and extending in the lateral direction of the vehicle. The triangular plate 32 serves as a parking-facilitating means for, when the driver is attempting to stop the vehicle at the temporary stop position A shown in FIG. 3, facilitating the driver to stop the vehicle at the temporary stop position A properly without being affected by the differences and variations among individual drivers.

The lower edge of each door mirror of the vehicle is slightly slanted toward the rear side of the vehicle as viewed from above. That is, the lower edge of each door mirror is slanted such that the outer portion of the door mirror in the lateral direction of the vehicle is closer to the rear side of the vehicle than the inner portion of the door mirror in the lateral direction of the vehicle is. Therefore, the triangular plate 32 is formed in the shape of a right-angled triangle as viewed from above, defined by the extension line of the lower edge of the door mirror and the extension line in the lateral direction of the vehicle, and the triangular plate 32 is arranged such that the right-angled apex is located on the inner side in the lateral direction of the vehicle and on the rear side of the vehicle and the acuter of the other two apexes points the outer side in the lateral direction of the vehicle.

According to the parking assist apparatus described above, when stopping the vehicle at the temporary stop position A, the driver visually confirms the positional relation between a specific portion of the target parking position B, such as the white line at the target parking position B, and the triangular plate 32 and then stops the vehicle at the temporary stop position A. In this manner, when stopping the vehicle beside the target parking position B, the driver can properly stop the vehicle at the temporary stop position A. According to the parking assist apparatus 31 described above, thus, the accuracy of the parking assist operation is high, and therefore the parking operation of the driver can be more properly assisted.

While the triangular plate 32 is used for facilitating the driver visually confirm a positional relation between the target parking position and the vehicle in the fourth example embodiment of the invention, a transparent portion may alternatively be used as in the parking assist apparatus of the fifth example embodiment of the invention described below.

Figure 10:
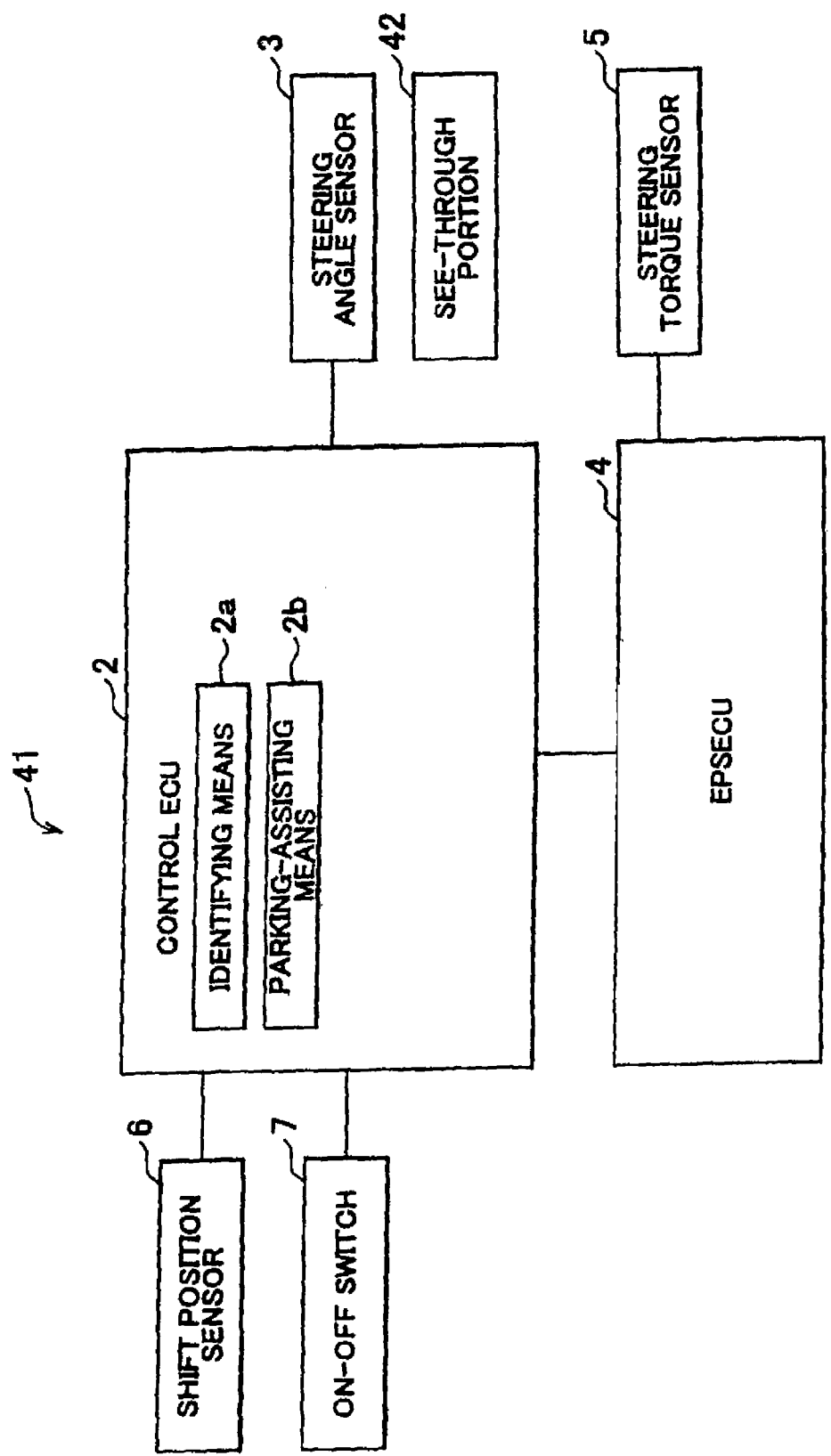
FIG. 10 is a block diagram illustrating the configuration of a parking assist apparatus according to the fifth example embodiment of the invention.
Figure 11:
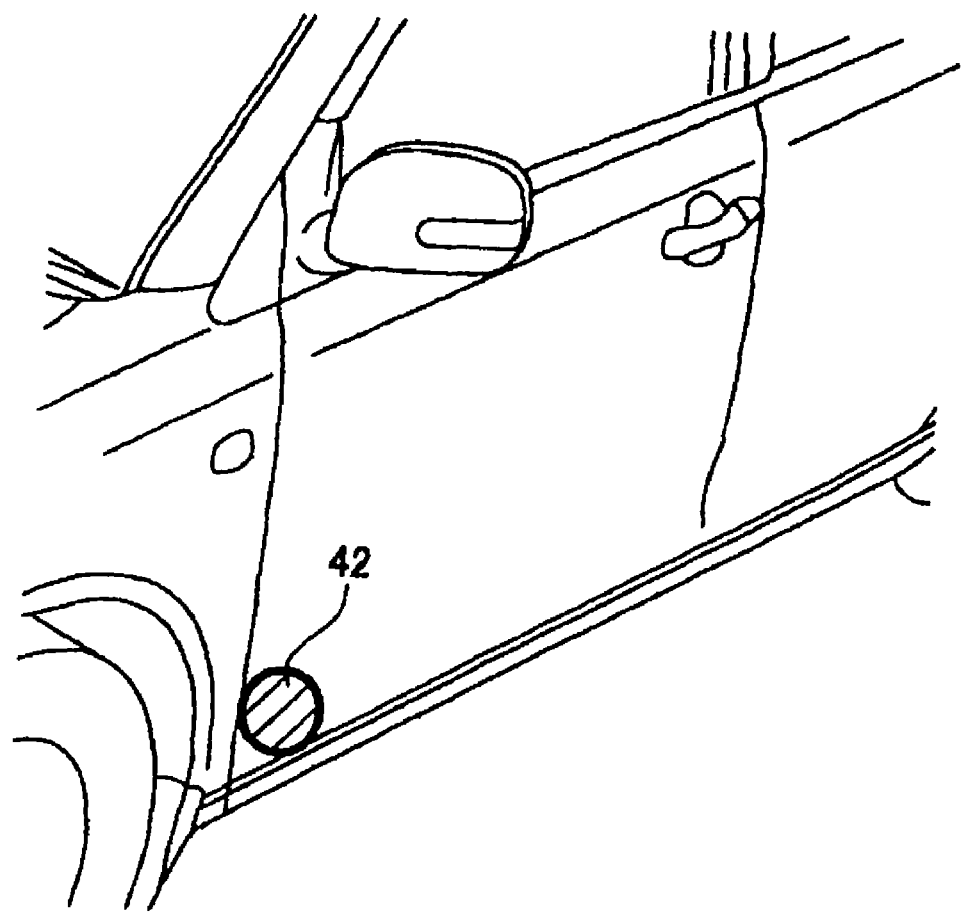
FIG. 11 is a view schematically showing a portion of the parking assist apparatus of the fifth example embodiment of the invention.

FIG. 10 is a block diagram showing the configuration of a parking assist apparatus 41 according to the fifth example embodiment of the invention. FIG. 11 is a view schematically showing a portion of the parking assist apparatus 41.

Referring to FIG. 10 and FIG. 11, the parking assist apparatus 41 has the control ECU 2, the steering angle sensor 3, the EPS-ECU 4, the steering torque sensor 5, the shift position sensor 6, the on-off switch 7, and a see-through portion 42. Note that the structural elements identical to those of the parking assist apparatus of the first example embodiment are denoted by the same reference numerals and their descriptions are not repeated.

As shown in FIG. 11, the see-through portion 42 is a transparent portion provided at the lower front portion in a passenger-side door, and enable the driver to visually confirm or observe the target parking position B therethrough. The see-through portion 42 is made of a transparent material such as acrylic and glass. Thus, the see-through portion 42 serves as a parking-facilitating means for, when the driver is attempting to stop the vehicle at the temporary stop position A shown in FIG. 3, facilitating the driver to stop the vehicle at the temporary stop position A properly without being affected by the differences and variations among individual drivers.

According to the parking assist apparatus described above, when stopping the vehicle at the temporary stop position A, the driver visually confirms the positional relation between a specific portion of the target parking position B, such as the white line at the target parking position B, and the see-through portion 42 and then stops the vehicle at the temporary stop position A. In this manner, when stopping the vehicle beside the target parking position B, the driver can properly stop the vehicle at the temporary stop position A. According to the parking assist apparatus 41 described above, thus, the accuracy of the parking assist operation is high, and therefore the parking operation of the driver can be more properly assisted.

A mark may be provided on the see-through portion 42 made of a transparent material such as acrylic and glass. In this case, for example, the driver visually confirms the positional relation between the mark on the see-through portion 42 and the white line at the target parking position B and then stops the vehicle at the temporary stop position A While the see-through portion 42 is used for facilitating the driver visually confirm a positional relation between the target parking position and the vehicle in the fourth example embodiment of the invention, the lower edge of the door mirror of the vehicle may alternatively be used as in the parking assist apparatus of the sixth example embodiment of the invention described below.

Figure 12:
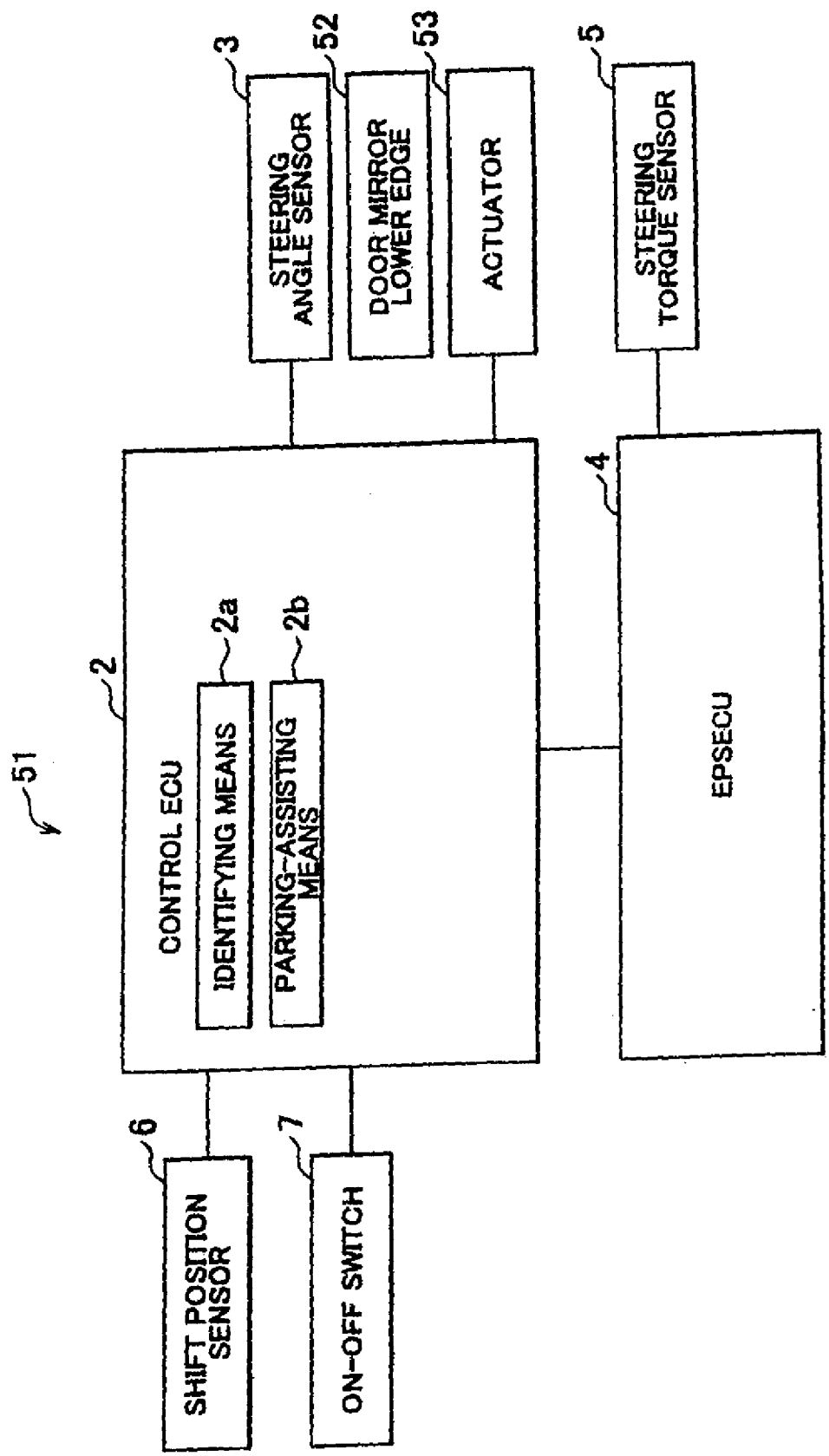
FIG. 12 is a block diagram illustrating the configuration of a parking assist apparatus according to the sixth example embodiment of the invention.
Figure 13:
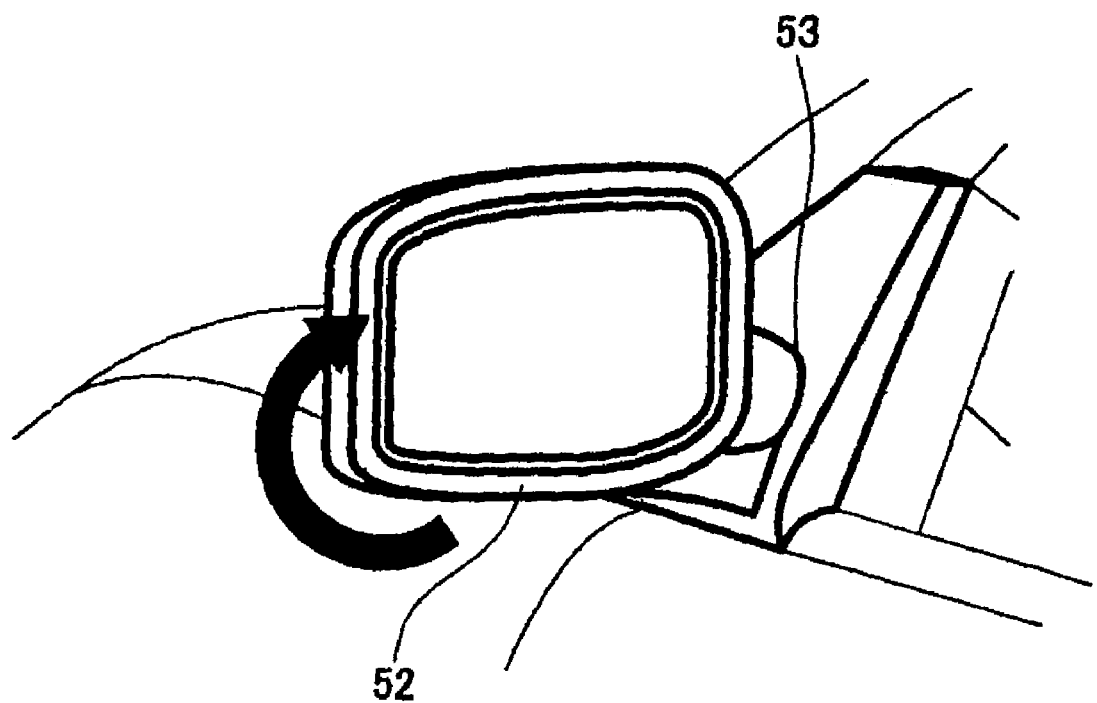
FIG. 13 is a view schematically showing a portion of the parking assist apparatus of the sixth example embodiment of the invention.

FIG. 12 is a block diagram showing the configuration of a parking assist apparatus 51 according to the sixth example embodiment of the invention. FIG. 13 is a view schematically showing a portion of the parking assist apparatus 51.

Referring to FIG. 12 and FIG. 13, the parking assist apparatus 51 has the control ECU 2, the steering angle sensor 3, the EPS-ECU 4, the steering torque sensor 5, the shift position sensor 6, the on-off switch 7, a lower edge 52 of the door mirror of the vehicle, and an actuator 53 for turning the door mirror about an axis extending in the vertical direction. Note that the structural elements identical to those of the parking assist apparatus of the first example embodiment are denoted by the same reference numerals and their descriptions are not repeated.

The actuator 53 serves as an adjusting means that adjusts the direction of the lower edge 52 of the door mirror of the vehicle, and the on-off switch 7 serves as an on-off means that turns the parking assist apparatus 51 on and off as needed. When the on-off switch 7 is on, the actuator 53 adjusts the direction of the lower edge 52 of the door mirror to the lateral direction of the vehicle based on commands from the parking-assisting means 2b of the control ECU 2.

In normal states, the lower edge 52 of each door mirror of the vehicle is slightly slanted toward the rear side of the vehicle as viewed from above. That is, the lower edge 52 of each door mirror is slanted such that the outer portion of the door mirror in the lateral direction of the vehicle is closer to the rear side of the vehicle than the inner portion of the door mirror in the lateral direction of the vehicle is. That is, when the on-off switch 7 is at on, the actuator 53 turns the door mirror about the axis extending in the vertical direction so as to move the outer portion of the lower edge 52 toward the front side of the vehicle as shown in FIG. 13.

Thus, the lower edge 52 of the door mirror of the vehicle and the actuator 53 serve as a parking-facilitating means for, when the driver is attempting to stop the vehicle at the temporary stop position A shown in FIG. 3, facilitating the driver to stop the vehicle at the temporary stop position A properly without being affected by the differences and variations among individual drivers.

According to the parking assist apparatus described above, when stopping the vehicle at the temporary stop position A, the driver visually confirms the positional relation between a specific portion of the target parking position B, such as the white line at the target parking position B, and the lower edge 52 of the door mirror of the vehicle and then stops the vehicle at the temporary stop position A. In this manner, when stopping the vehicle beside the target parking position B, the driver can properly stop the vehicle at the temporary stop position A. According to the parking assist apparatus 51 described above, thus, the accuracy of the parking assist operation is high, and therefore the parking operation of the driver can be more properly assisted.

According to the parking assist apparatus described above, further, because the direction of the lower edge 52 of the door mirror of the vehicle is adjusted to the lateral direction of the vehicle only when the on-off switch 7 of the parking assist apparatus 51 is on, the door mirror can be used as usual when the parking assist apparatus 51 is not used.

While the lower edge 52 of the door mirror of the vehicle is used for facilitating the driver visually confirm a positional relation between the target parking position and the vehicle in the sixth example embodiment of the invention, a projecting portion projecting upward from a corner of the front side of the vehicle may alternatively be used as in the parking assist apparatus of the seventh example embodiment of the invention described below.

Figure 14:
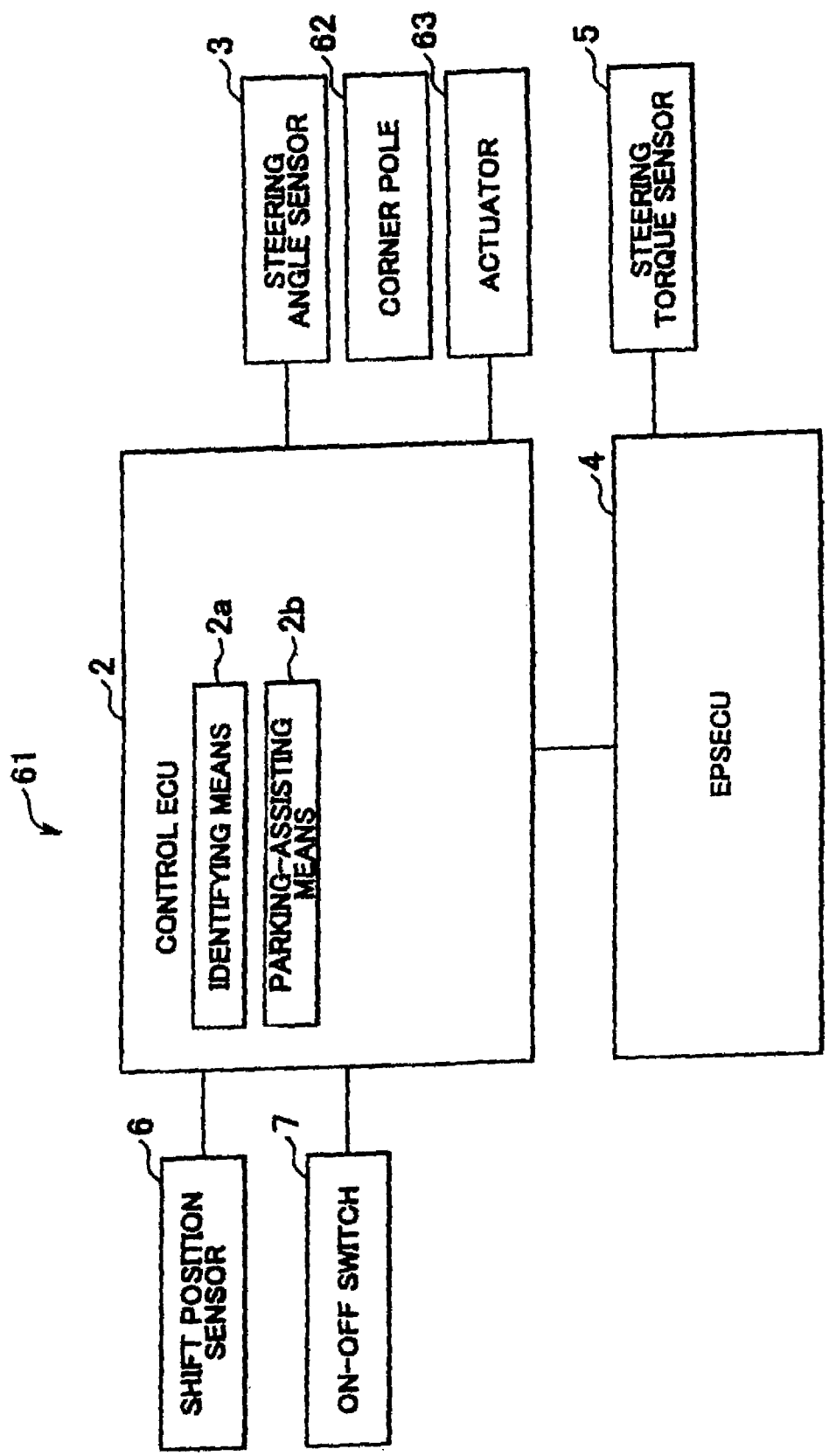
FIG. 14 is a block diagram illustrating the configuration of a parking assist apparatus according to the seventh example embodiment of the invention.
Figure 15:
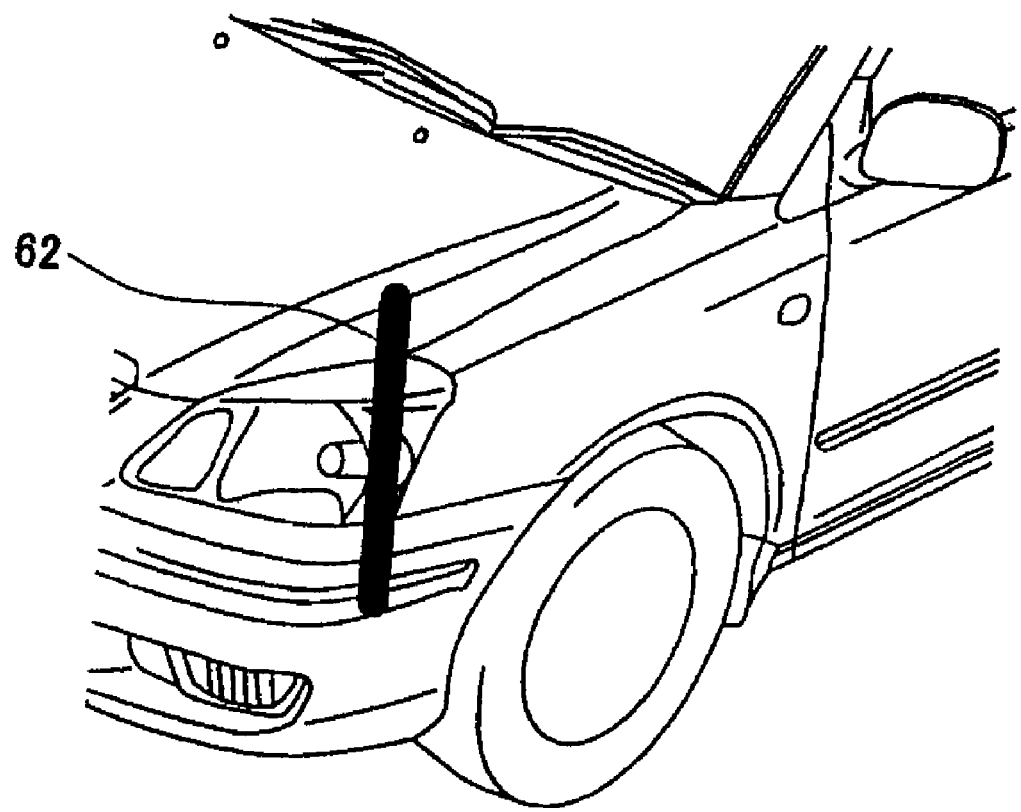
FIG. 15 is a view schematically showing a portion of the parking assist apparatus of the seventh example embodiment of the invention.

FIG. 14 is a block diagram showing the configuration of a parking assist apparatus 61 according to the seventh example embodiment of the invention. FIG. 15 is a view schematically showing a portion of the parking assist apparatus 61.

Referring to FIG. 14 and FIG. 15, the parking assist apparatus 61 has the control ECU 2, the steering angle sensor 3, the EPS-ECU 4, the steering torque sensor 5, the shift position sensor 6, the on-off switch 7, a corner pole 62, and an actuator 63 for driving the corner pole 62 to project upward. Note that the structural elements identical to those of the parking assist apparatus of the first example embodiment are denoted by the same reference numerals and their descriptions are not repeated.

The corner pole 62 is a projecting portion provided at a corner of the front side of the vehicle and projecting upward. The on-off switch 7 serves as an on-off means that turns the parking assist apparatus 61 on and off as needed. When the on-off switch 7 is on, the actuator 63 serves as a driving means that drives the corner pole 62 to project upward based on commands from the parking-assisting means 2b of the control ECU 2.

Thus, the corner pole 62 and the actuator 63 serve as a parking-facilitating means for, when the driver is attempting to stop the vehicle at the temporary stop position A shown in FIG. 3, facilitating the driver to stop the vehicle at the temporary stop position A properly without being affected by the differences and variations among individual drivers.

According to the parking assist apparatus described above, when stopping the vehicle at the temporary stop position A, the driver visually confirms the positional relation between a specific portion of the target parking position B, such as the white line at the target parking position B, and the corner pole 62 and then stops the vehicle at the temporary stop position A. In this manner, when stopping the vehicle beside the target parking position B, the driver can properly stop the vehicle at the temporary stop position A. According to the parking assist apparatus 61 described above, thus, the accuracy of the parking assist operation is high, and therefore the parking operation of the driver can be more properly assisted.

According to the parking assist apparatus described above, further, because the corner pole 62 is driven to project upward only when the on-off switch 7 of the parking assist apparatus 61 is on, the exterior design of the vehicle is not restricted by the corner pole 62 when the parking assist apparatus 61 is not used.

While the corner pole 62 is used for facilitating the driver visually confirm a positional relation between the target parking position and the vehicle in the seventh example embodiment of the invention, the vehicle door mirror and a laser irradiator may alternatively be used as in the parking assist apparatus of the eighth example embodiment of the invention described below.

Figure 16:
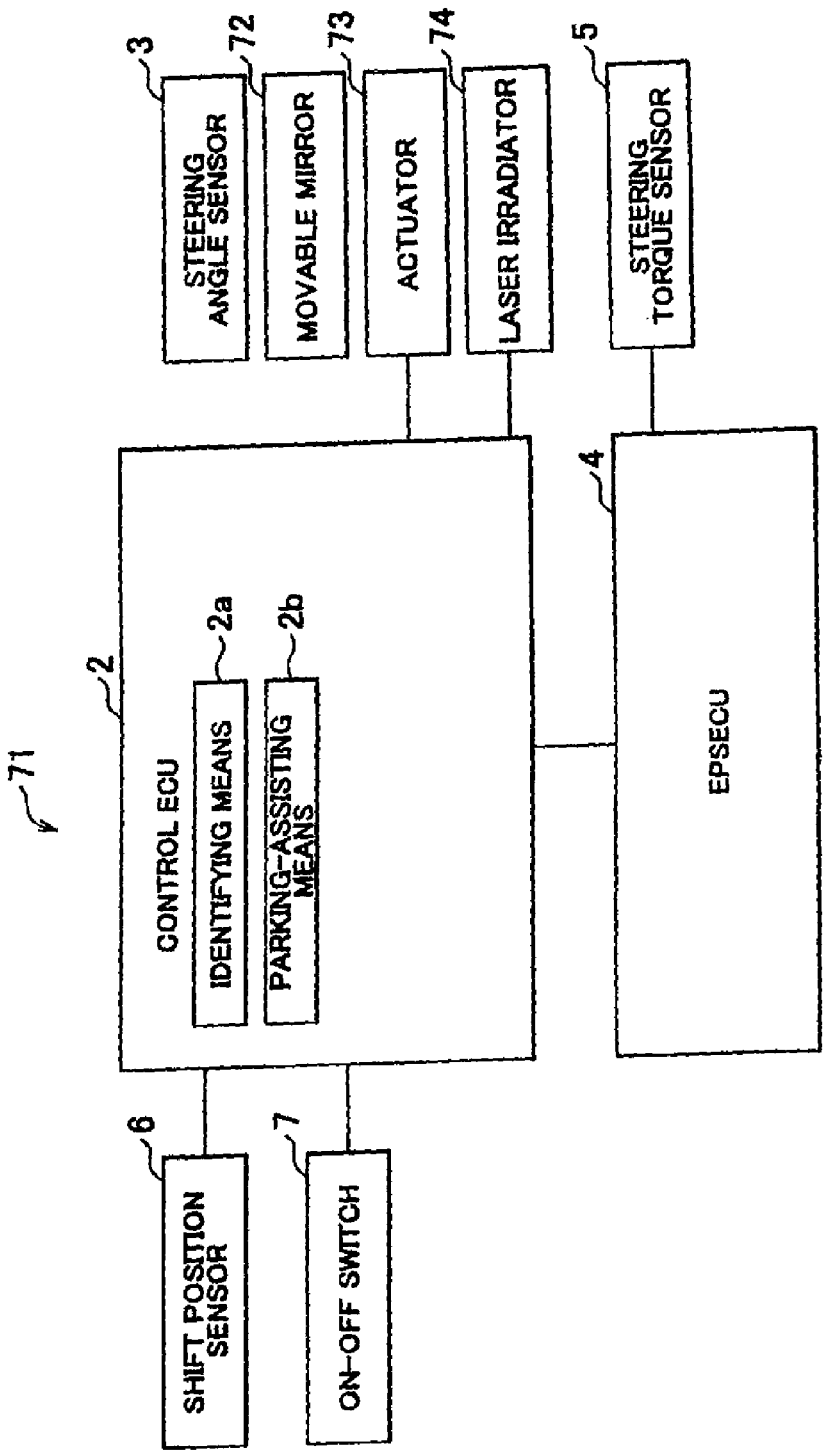
FIG. 16 is a block diagram illustrating the configuration of a parking assist apparatus according to the eighth example embodiment of the invention.
Figure 17:
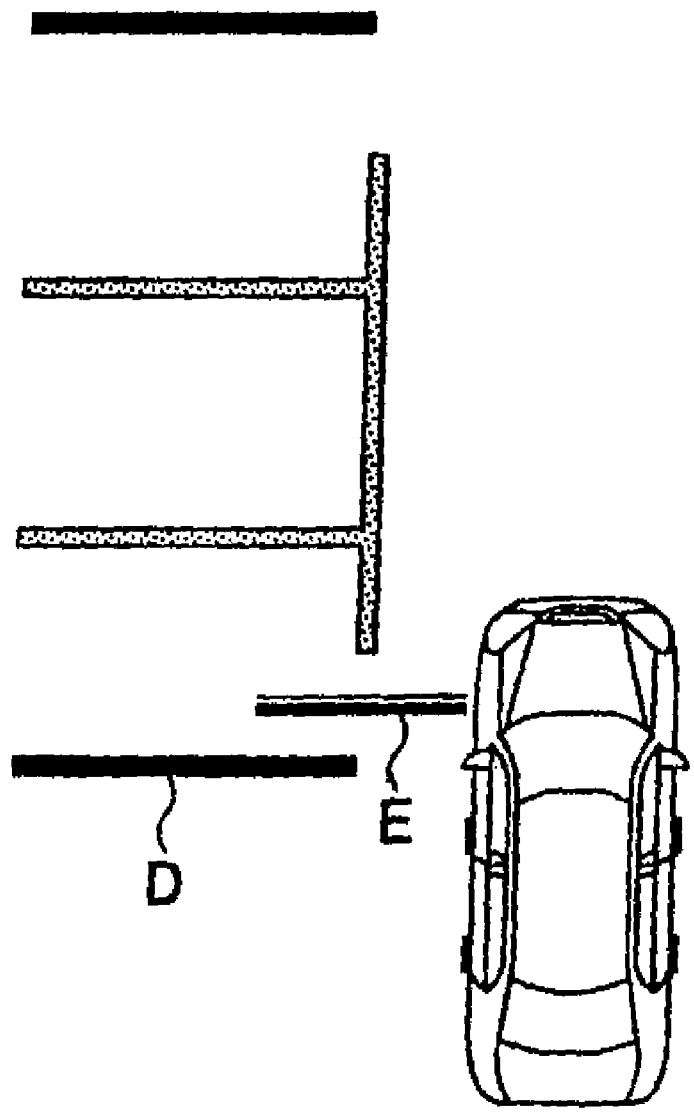
FIG. 17 is a view schematically illustrating how the parking assist apparatus according to the eighth example embodiment of the invention works.

FIG. 16 is a block diagram showing the configuration of a parking assist apparatus 71 according to the eighth example embodiment of the invention. FIG. 17 is a view schematically illustrating how the parking assist apparatus 71 works.

Referring to FIG. 16, the parking assist apparatus 71 has the control ECU 2, the steering angle sensor 3, the EPS-ECU 4, the steering torque sensor 5, the shift position sensor 6, the on-off switch 7, a movable mirror 72 of the door mirror of the vehicle, an actuator 73 for adjusting the angle of the movable mirror 72, and a laser irradiator 74. Note that the structural elements identical to those of the parking assist apparatus of the first example embodiment are denoted by the same reference numerals and their descriptions are not repeated.

The movable mirror 72 is movable and the actuator 73 serves as an adjusting means for adjusting the angle of the movable mirror 72 so as to enable the driver to visually confirm the target parking position B. The laser irradiator 74 serves as an irradiating means that radiates lasers toward the road surface on the outer side in the lateral direction, that is, obliquely downward toward the outside in the lateral direction of the vehicle.

Thus, the movable mirror 72, the actuator 73, and/or the laser irradiator 74 serve as a parking-facilitating means for, when the driver is attempting to stop the vehicle at the temporary stop position A shown in FIG. 3, facilitating the driver to stop the vehicle at the temporary stop position A properly without being affected by the differences and variations among individual drivers.

The on-off switch 7 serves as an on-off means that turns the parking assist apparatus 71 on and off. When the on-off switch 7 is on, the actuator 73 adjusts the angle of the movable mirror 72 based on commands from the parking-assisting means 2b of the control ECU 2 such that the driver can visually confirm the target parking position B. Furthermore, the laser irradiator 74 radiates lasers based on the parking assisting means 2b of the control ECU 2. More specifically, the actuator 73 adjusts the angle of the movable mirror 72 such that the perpendicular line of the movable mirror 72 is directed obliquely downward toward the outside in the lateral direction of the vehicle.

According to the parking assist apparatus described above, when stopping the vehicle at the temporary stop position A, the driver visually confirms the positional relation between a specific portion of the target parking position B, such as the white line D shown in FIG. 17, and the laser E radiated to the road surface. In this manner, when stopping the vehicle beside the target parking position B, the driver can properly stop the vehicle at the temporary stop position A. According to the parking assist apparatus 71 described above, thus, the accuracy of the parking assist operation is high, and therefore the parking operation of the driver can be more properly assisted.

According to the parking assist apparatus described above, further, because the angle of the movable mirror 72 is adjusted so as to enable the driver to visually confirm the target parking position B only when the on-off switch 7 of the parking assist apparatus 71 is on, the door mirror can be used as usual when the. parking assist apparatus 71 is not used.

According to the parking assist apparatus described above, further, the laser irradiation is performed only when the on-off switch 7 of the parking assist apparatus 71 is on, that is, the laser irradiation is stopped when the parking assist apparatus 71 is not used, which improves the safety for small pedestrians such as children.

While the door mirror of the vehicle and the laser irradiator 74 are used for facilitating the driver visually confirm a positional relation between the target parking position and the vehicle in the seventh example embodiment of the invention, headlights may alternatively be used as in the parking assist apparatus of the ninth example embodiment of the invention described below.

Figure 18:
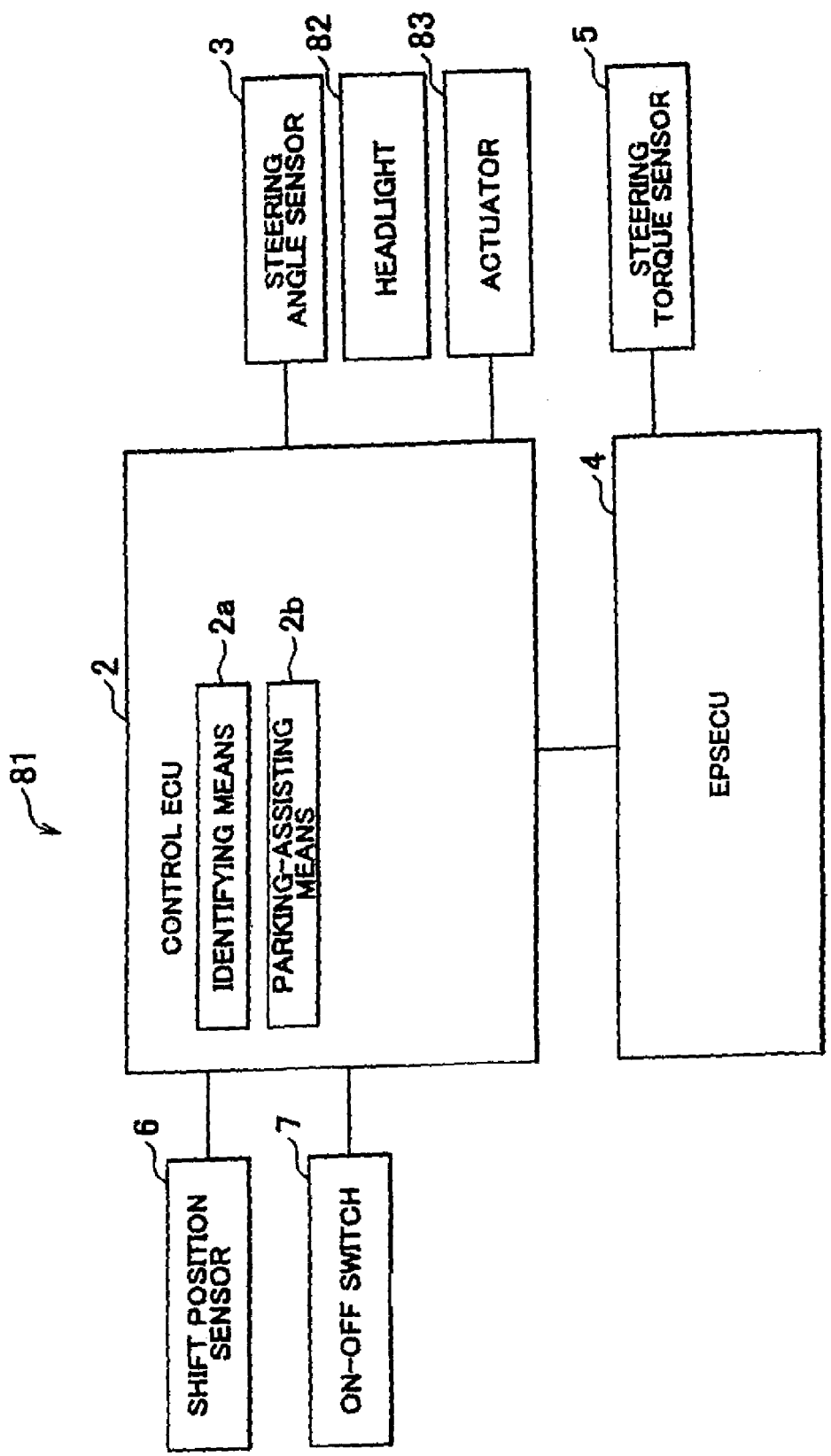
FIG. 18 is a block diagram illustrating the configuration of a parking assist apparatus according to the ninth example embodiment of the invention.
Figure 19:
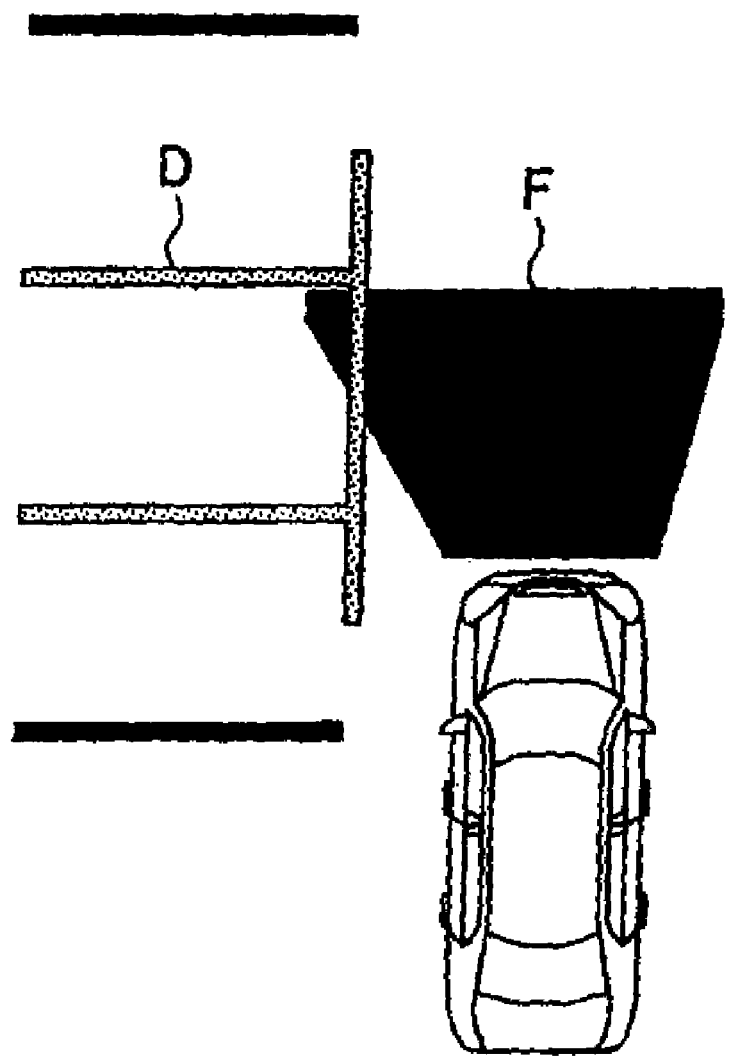
FIG. 19 is a view schematically illustrating how the parking assist apparatus according to the ninth example embodiment of the invention works.

FIG. 18 is a block diagram showing the configuration of a parking assist apparatus 81 according to the ninth example embodiment of the invention. FIG. 19 is a view schematically illustrating how the parking assist apparatus 81 works.

Referring to FIG. 18, the parking assist apparatus 81 has the control ECU 2, the steering angle sensor 3, the EPS-ECU 4, the steering torque sensor 5, the shift position sensor 6, the on-off switch 7, headlights 82, and an actuator 83 for adjusting the angel of the headlights 82 about an axis extending in the lateral direction of the vehicle. Note that the structural elements identical to those of the parking assist apparatus of the first example embodiment are denoted by the same reference numerals and their descriptions are not repeated.

The headlights 82 are the headlights of the vehicle, and the actuator 83 serves as optical-axis adjusting means that adjusts the optical axis of each headlight 82. Thus, the headlights 82 and the actuator 83 serve as a parking-facilitating means for, when the driver is attempting to stop the vehicle at the temporary stop position A shown in FIG. 3, facilitating the driver to stop the vehicle at the temporary stop position A properly without being affected by the differences and variations among individual drivers.

The on-off switch 7 serves as an on-off means that turns the parking assist apparatus 71 on and off. When the on-off switch.7 is on, the actuator 83 adjusts the optical axis of the headlights 82 based on commands from the parking-assisting means 2b of the control ECU 2 so as to tilt, in this example embodiment, the optical axis downward.

According to the parking assist apparatus described above, when stopping the vehicle at the temporary stop position A, the driver visually confirms the positional relation between a specific portion of the target parking position B, such as the white line D shown in FIG. 19, and an edge F of the area on the road surface to which light is radiated from the headlights 82 and then stops the vehicle at the temporary stop position A. In this manner, when stopping the vehicle beside the target parking position B, the driver can properly stop the vehicle at the temporary stop position A. According to the parking assist apparatus 81 described above, thus, the accuracy of the parking assist operation is high, and therefore the parking operation of the driver can be more properly assisted.

According to the parking assist apparatus described above, further, because the optical axis of the headlights 82 is adjusted only when the on-off switch 7 of the parking assist apparatus 81 is on, the headlights 82 can be used as usual when the parking assist apparatus 81 is not used.

While some embodiments of the invention have been illustrated above, it is to be understood that the invention is not limited to details of the illustrated embodiments, but may be embodied with various changes, modifications or improvements, which may occur to those skilled in the art, without departing from the spirit and scope of the invention.

Thus, the invention relates to parking assist apparatuses for vehicles and provides more appropriate parking assist operation for drives. Thus, the invention can be applied to various vehicles including passenger cars, trucks, and buses.

The invention claimed is:

1. A parking assist apparatus for a vehicle, comprising:
    an identifying portion that identifies a target parking position when the vehicle is at a temporary stop position having a predetermined positional relation with the target parking position;
    a parking-assisting portion that assists steering operation of a driver of the vehicle based on the target parking position when parking the vehicle; and
    a polarizing film, provided on a side window glass of the vehicle and having a polarization direction coinciding with the lateral direction of the vehicle, for facilitating the driver to visually confirm a positional relation between a specific portion of the target parking position and the vehicle.

2. The parking assist apparatus according to claim 1, further comprising
    a vehicle inner mark for facilitating the driver to visually confirm a positional relation between a specific portion of the target parking position and the vehicle in a three dimensional manner when the driver stops the vehicle at the temporary stop position,
    wherein the polarizing film facilitates the driver to visually confirm the positional relation in a three dimensional manner.

3. The parking assist apparatus according to claim 2, wherein
    the vehicle inner mark is provided under the polarizing film.

4. The parking assist apparatus according to claim 1, wherein
   the specific portion of the target parking position is a line of the target parking position extending in the width direction of the vehicle.

5. The parking assist apparatus according to claim 1, further comprising
   on-off means for turning the parking assist apparatus on and off,
   wherein
   the identifying means identifies the target parking position when the on-off means is turned on at the temporary stop position.

6. The parking assist apparatus according to claim 1, further comprising
   a vehicle-inner-side mark, of which the direction coincides with the polarization direction of the polarization film, is provided on the inner side of the vehicle.

* * * * *